United States Patent
Parekh et al.

(10) Patent No.: US 12,375,921 B2
(45) Date of Patent: Jul. 29, 2025

(54) WIRELESS INTRUSION PREVENTION

(71) Applicant: Arista Networks, Inc., Santa Clara, CA (US)

(72) Inventors: Jatin Parekh, Mumbai (IN); Anubhav Gupta, Jaipur (IN); Amogh Dasture, Pune (IN); Nadeem Akhtar, Navi Mumbai (IN)

(73) Assignee: Arista Networks, Inc., Santa Clara, CA (US)

( * ) Notice: Subject to any disclaimer, the term of this patent is extended or adjusted under 35 U.S.C. 154(b) by 357 days.

(21) Appl. No.: 17/835,117

(22) Filed: Jun. 8, 2022

(65) Prior Publication Data

US 2023/0413053 A1    Dec. 21, 2023

(51) Int. Cl.
*H04W 12/088* (2021.01)
*H04W 12/00* (2021.01)

(52) U.S. Cl.
CPC ....... *H04W 12/088* (2021.01); *H04W 12/009* (2019.01)

(58) Field of Classification Search
CPC .................................................. H04W 12/06
See application file for complete search history.

(56) References Cited

U.S. PATENT DOCUMENTS

| | | | |
|---|---|---|---|
| 7,002,943 B2 | 2/2006 | Bhagwat et al. | |
| 7,154,874 B2 | 12/2006 | Bhagwat et al. | |
| 7,216,365 B2 | 5/2007 | Bhagwat et al. | |
| 7,333,481 B1 | 2/2008 | Rawat et al. | |
| 7,333,800 B1 | 2/2008 | Gopinath | |
| 7,339,914 B2 | 3/2008 | Bhagwat et al. | |
| 7,406,320 B1 | 7/2008 | Kumar et al. | |
| 7,440,434 B2 | 10/2008 | Chaskar et al. | |
| 7,447,184 B1 | 11/2008 | Kharvandikar et al. | |
| 7,496,094 B2 | 2/2009 | Gopinath et al. | |
| 7,536,723 B1 | 5/2009 | Bhagwat et al. | |
| 7,558,253 B1 | 7/2009 | Rawat et al. | |
| 7,710,933 B1 | 5/2010 | Sundaralingam et al. | |
| 7,751,393 B2 | 7/2010 | Chaskar et al. | |
| 7,764,648 B2 | 7/2010 | Gopinath et al. | |
| 7,804,808 B2 | 9/2010 | Bhagwat et al. | |
| 7,856,209 B1 | 12/2010 | Rawat | |
| 7,856,656 B1 | 12/2010 | Kharvandikar et al. | |
| 7,970,894 B1 | 6/2011 | Patwardhan | |
| 7,971,253 B1 | 6/2011 | Gupta | |
| 8,032,939 B2 | 10/2011 | Panitkar et al. | |

(Continued)

OTHER PUBLICATIONS

Arista Networks, Inc., Review of Detection, Classification, and Prevention Techniques in WIPS, Arista.com, n.d. (2018), Arista Networks, Inc., Santa Clara, CA, United States.

*Primary Examiner* — Viral S Lakhia
(74) *Attorney, Agent, or Firm* — Treyz Law Group, P.C.; Tianyi He (57) ABSTRACT

A networking system may disrupt an unauthorized wireless connection to the network. In particular, the networking system may detect a wireless connection between a client device and an unauthorized wireless access point. The networking system may receive a probe request management frame from the client device. The network system may, responsive to the detection of the wireless connection, send a probe response management frame to the client device.

20 Claims, 6 Drawing Sheets

(56) References Cited

U.S. PATENT DOCUMENTS

| | | | |
|---|---|---|---|
| 8,099,107 B2* | 1/2012 | Thomson | H04W 4/029 |
| | | | 370/254 |
| 8,789,191 B2 | 7/2014 | Bhagwat et al. | |
| 9,003,527 B2 | 4/2015 | Bhagwat et al. | |
| 9,775,019 B2* | 9/2017 | Mestanov | H04W 76/16 |
| 9,913,201 B1* | 3/2018 | Harmon | H04W 4/023 |
| 10,129,211 B2* | 11/2018 | Heath | G06Q 30/02 |
| 10,257,779 B2* | 4/2019 | Jung | H04W 48/14 |
| 10,785,703 B1* | 9/2020 | V | H04W 12/122 |
| 11,284,474 B1* | 3/2022 | Chu | H04W 72/30 |
| 2009/0016529 A1 | 1/2009 | Gopinath et al. | |
| 2015/0012971 A1 | 1/2015 | Ram et al. | |
| 2018/0007030 A1* | 1/2018 | Penov | H04W 4/029 |
| 2019/0116545 A1* | 4/2019 | Verma | H04W 48/08 |
| 2021/0045052 A1* | 2/2021 | Nellore | H04W 48/20 |
| 2021/0112414 A1* | 4/2021 | Huang | H04W 12/122 |
| 2021/0377369 A1* | 12/2021 | Patil | H04L 41/082 |
| 2022/0084066 A1* | 3/2022 | Kisko | G06Q 30/0255 |
| 2023/0007487 A1* | 1/2023 | Jain | H04W 12/122 |
| 2023/0247422 A1* | 8/2023 | Lin | H04W 12/06 |
| | | | 726/6 |
| 2023/0300751 A1* | 9/2023 | Ficara | H04W 52/0235 |
| | | | 370/311 |

* cited by examiner

WIRELESS INTRUSION PREVENTION

BACKGROUND

This relates to Wi-Fi networks, and more particularly, to one or more wireless access points in wireless networks.

A network can include one or more wireless access points (APs) that wirelessly connects one or more wireless client devices. Using these wireless connections, the client devices can connect to the network through the access points.

A client device authorized to connect to the network may sometimes connect to an unauthorized wireless access point such as an external access points operating (providing access to) an entirely different external network or a rogue access point providing a wireless connection to the network that is unauthorized by an administrator of the network. It may therefore be desirable to selectively sever the wireless connection between the client device and the unauthorized wireless access point to avoid authorized access of sensitive information on the authorized client device (associated with the network organization) without disrupting other wireless connections.

While Deauthentication management frames are typically used to disrupt the undesired wireless connections, with the implementation of Management Frame Protection (MFP) (e.g., in the IEEE 802.11w amendment to the IEEE 802.11 standard) and MFP being a mandatory feature with Wi-Fi Protected Access version 3 (WPA3), it is no longer possible to disrupt the undesired wireless connections using Deauthentication management frames because Deauthentication management frames are encrypted under MFP and cannot be spoofed.

It is within this context that the embodiments described herein arise.

DETAILED DESCRIPTION

A computer network can include network equipment forming a variety of network elements that interconnect end hosts of the network. Network element can include switches, bridges, routers, hubs, repeaters, firewalls, devices serving other networking functions, and devices that include the functionality of two or more of these devices. End hosts of the network can include computers, servers, network service devices, and any other suitable types of specialized or general-purpose host equipment, each serving client-side and/or server-side functionalities.

Figure 1:
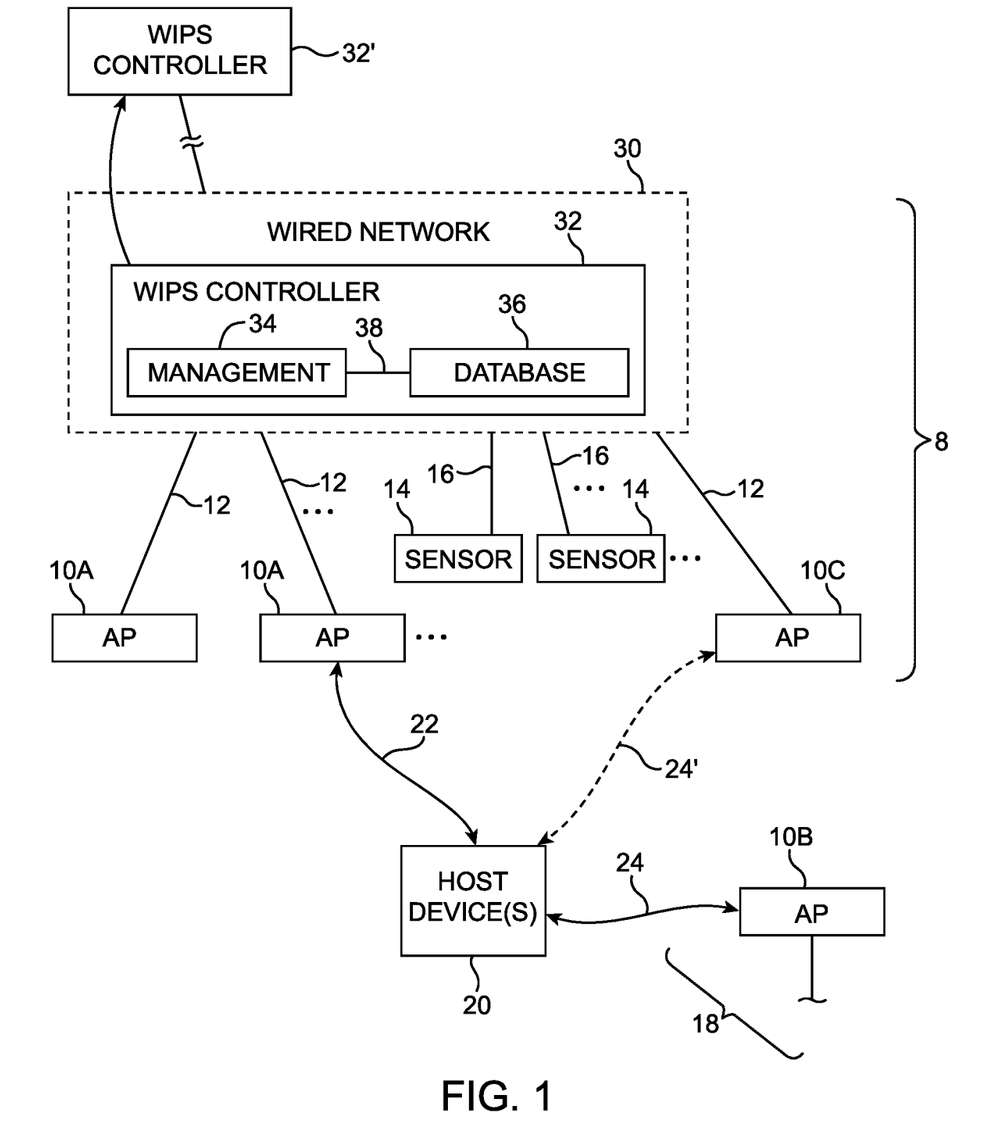
FIG. 1 is a functional block diagram of an illustrative network having access points wirelessly connected to client devices and implementing a wireless intrusion prevention system (WIPS) in accordance with some embodiments.

To support wireless connectivity to the network, the network can include one or more access points that connects host devices such as client devices to other portions of the network such as a wired portion of the network. FIG. 1 is a diagram of an illustrative network such as network 8 containing one or more wireless access points such as access points 10A. In general, any suitable number of access points may exist to extend the wireless connectivity (coverage) supported by network 8.

Each access point 10A may wirelessly connect to one or more host devices 20 such as client devices (e.g., desktop computers, laptop computers, smartphones, and/or other Wi-Fi-enabled devices) through corresponding wireless communication links 22. Through access point 10A, a connected host device 20 can connect to network 8. Network 8 may include any suitable number and/or types of network elements, at least some of which are connected by one or more wired technologies or standards such as Ethernet (e.g., using copper cables and/or fiber optic cables), thereby forming wired network portion 30.

In particular, wireless communication links 22 may be based on IEEE 802.11 standards and Wi-Fi protocols for implementing wireless local area network (WLAN) communications. Data communicated between a pair of access point 10 and host device 20 through a corresponding wireless link 22 may be further conveyed to and from other parts of network 8 (e.g., network portion 30) using a corresponding wired path 12 such as an Ethernet connection.

In some scenarios, a host device 20 may form undesired wireless network connections such as connection 24 to access point 10B instead of connection 22 to an access point 10A (e.g., an authorized access point of network 8). Access point 10B may be an external access point that operates in (e.g., provide wireless connectivity for) an external network 18 that is separate from network 8. In particular, host device 20 may be a client device that belongs to the organization of network 8 and/or a client device authorized to operate in network 8 (sometimes referred to as a network client device or a client device in the network). Accordingly, these undesired wireless connections may risk sensitive information on host device 20 being exposed to an external organization (e.g., through access point 10B and network 18) or other security risks.

As another example, even connection 24' between a host device 20 and access point 10C operating in the same network 8 may be undesirable because access point 10C may be a rogue access point not authorized (by an administrator of network 8) to operate in network 8, while host device 20 may be a client device operated by an external organization or adversary. Similarly, connection 24' may pose security risks by allowing unauthorized wireless connections to network 8 (through unauthorized access point 10C).

In one illustrative configuration, to detect and prevent these undesired connections, network 8 may implement a wireless intrusion prevention system having a centralized WIPS controller 32 with management equipment 34 and/or database equipment 36 (e.g., data storage equipment) coupled to management equipment 34. As an example, portions of controller 32 may be implemented on server equipment such as servers and data storage devices housed in server racks. In this example, management equipment 34 may sometimes be referred to as a management server and database equipment may sometimes be referred to as a database server. If desired, management and database functional portions of controller 32 may be implemented on one or more stand-alone WIPS devices or in other suitable manners. In some illustrative arrangements described herein, network 8 may omit a centralized WIPS controller 32, if desired.

While WIPS controller 32 is shown in FIG. 1 to be implemented within a wired portion of network 8, this is merely illustrative. If desired, a WIPS controller may be implemented separately from the wired portion of network 8. As an example, a WIPS controller such as WIPS controller 32' (e.g., instead of WIPS controller 32 in wired network 30) may be implemented on cloud server equipment or generally be hosted as an application on other computing equipment and may be connected to access points and sensors in the WIPS over one or more service provider networks such as the Internet and/or over the wired portion of network 8. In general, a WIPS controller may be formed using any suitable equipment communicatively coupled to access points and sensors in the WIPS.

Radio-frequency sensors such as WIPS sensors 14 or sensors for the WIPS may be connected to WIPS controller 32 via paths 16. In particular, one or more sensors 14 may receive radio-frequency signals in their respective airspaces (e.g., in their vicinities) and therefore may gather sensor data indicative of the radio-frequency environment in which access points 10A, 10B, and 10C, host devices 20, and/or other WLAN devices operate. While WIPS sensors 14 are shown to be separate elements from access points 10A, this is merely illustrative. If desired, one or more access points 10A may also serve as WIPS sensors that gather sensor data indicative of the operating radio-frequency environment (in addition to providing wireless connectivity for client devices). If desired, one or more access points 10A may include WIPS sensors as part of its hardware.

The sensor data collected by WIPS sensors 14 (or by access points 10A also serving as WIPS sensors) may be conveyed to database equipment 36 for storage via paths 16 (or paths 12 for access points 10A). Management equipment 34 may receive the sensor data from database equipment 36 via path 38 and analyze the stored sensor data to detect undesired wireless connection such as connections 24 and/or 24'. As examples, based on the sensor data, management equipment 34 may classify access points as authorized access points 10A or unauthorized access points such as external network access points 10B or rogue access points 10C, may detect client devices 20 with wireless connections with access points 10A, 10B, and 10C, may determine whether or not the connected client devices 20 are network-authorized client devices or external network devices, etc., to determine whether an undesired wireless connection is being made by a network client device, by a rogue access point, etc.

Management equipment 34 may then take appropriate actions to selectively sever the undesired wireless connection or otherwise prevent unauthorized access to network 8 and/or client devices 20 associated with network 8. As an example, management equipment 34 may send information and/or commands indicative of the undesired wireless connection (e.g., configuration and/or control signals), or other information to one or more access points 10 via paths 12 to cause one or more access points 10 to attempt to sever the undesired wireless connection.

In general, network paths 12, 16, and 38 connecting various portions of the WIPS (e.g., management portion of controller 32, database portion of controller 32, access points 10A, sensors 14, etc.) may be implemented using any suitable connections formed, as examples, from one or more Ethernet connections, through one or more intervening network elements (e.g., switches, routers, service provider networks, etc.), from connections between these intervening network elements, etc.

While, in the example of FIG. 1, network 8 implements a centralized WIPS controller 32 to implement the detection and prevention functions described herein, this is merely illustrative. If desired, network 8 may omit a centralized WIPS controller and/or may use an access point 10A to implement some or all of the functionalities of detection and prevention of wireless intrusion. As an illustrative example, one or more access points 10A, each serving both sensor and wireless connectivity functions, may gather sensor data, store and analyze the gathered sensor data internally on the access point to detect undesired wireless connection, and may take preventive measures to selectively sever or otherwise disrupt the undesired wireless connection.

Figure 2:
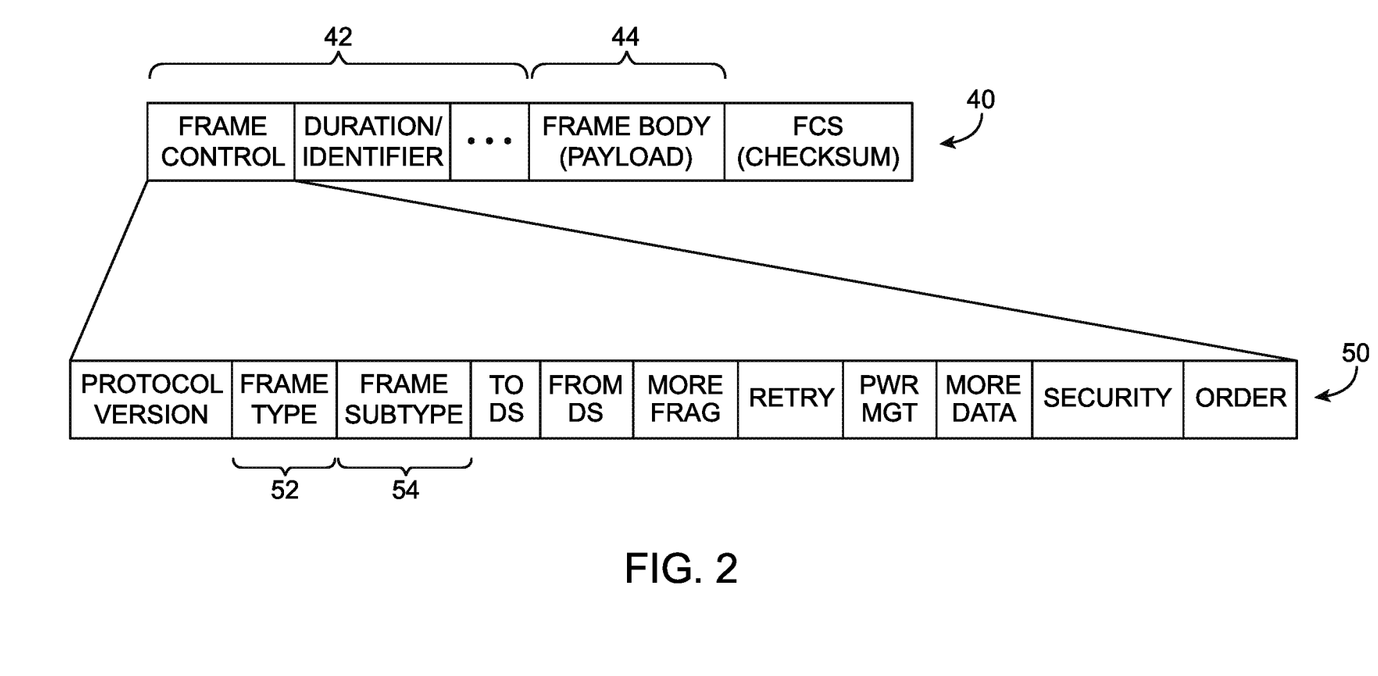
FIG. 2 is a diagram of an illustrative wireless local area network (WLAN) media access control (MAC) frame in accordance with some embodiments.

To sever undesired wireless connections, an authorized access point 10A may send WLAN Media Access Control (MAC) management frames (e.g., based on the IEEE 802.11 standards or Wi-Fi standards) to one or more of hosts devices 20 (and if applicable to other access points 10B or 10C). FIG. 2 is a diagram of an illustrative WLAN MAC frame such as frame 40.

As shown in FIG. 2, WLAN MAC frame includes a header portion such as header 42, a body or payload portion such as frame body 44, and a checksum (e.g., frame check sequence (FCS)). Header 42 may include a number of fields (e.g., nine fields) such as a frame control field, a duration or connection identifier field, addresses (e.g., receiver, sender, filtering, and optional), etc. Frame control field 50 (further detailed in an expanded view in FIG. 2) may include information indicative of MAC frame 40 being a management frame and the type of management frame. In particular, as shown in FIG. 2, frame control field 50 may include a frame type field 52 having (two) bits indicative of a management frame (or a control or data frame) and a frame subtype field 54 having (four) bits indicative of a (sub)type of management frame (or a subtype of other types of frames).

A wireless intrusion protection system (WIPS) typically employs Deauthentication management frames (e.g., uses access points 10A or WIPS sensors 14 to send Deauthentication management frames) to disrupt undesired wireless connections such as connections 24 or 24' as shown in FIG. 1. However, with the implementation of Management Frame Protection (MFP) (e.g., in the IEEE 802.11w amendment to the IEEE 802.11 standard), which is mandatory with WPA3, it is no longer possible to disrupt the undesired wireless connections using Deauthentication management frames as Deauthentication management frames are encrypted under MFP.

As such, in a network employing MFP connections, a WIPS may employ Probe Response management frames, which are not protected under MFP, to selectively disrupt the undesired wireless connections. In particular, authorized access points 10A (and/or WIPS sensors 14) in the WIPS may send Probe Response management frames to disrupt the undesired wireless connections.

Figure 3:
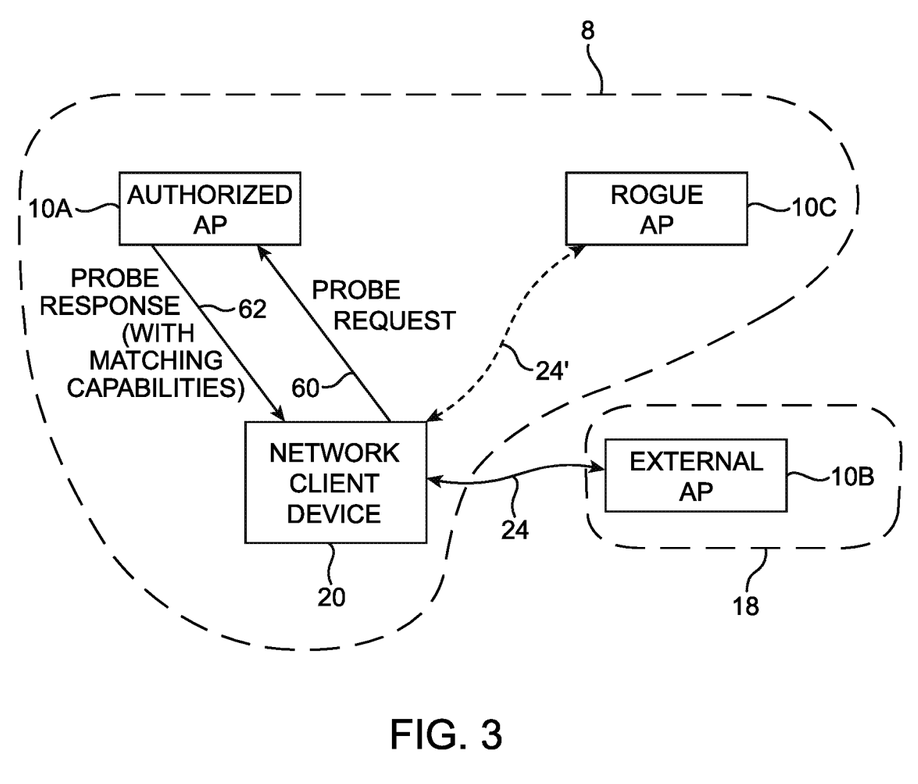
FIG. 3 is a diagram of illustrative communication between an authorized client device and an authorized access point in response to detecting an unauthorized wireless connection to the authorized network client device in accordance with some embodiments.

FIG. 3 is a diagram illustrating the use of unicast Probe Response management frames to selectively sever or otherwise disrupt an undesired or unauthorized wireless connection. In the example of FIG. 3, a network client device 20 (e.g., belonging to network 8, belonging to the network organization) may attempt to connect and/or be connected to an (unauthorized) external access point 10B belonging to a separate network 18 via connection 24. The WIPS using its sensors (sensors 14 and/or access points 10A in FIG. 1) or authorized access point 10A operating individually may detect connection 24 and identify that connection 24 is an undesired or unauthorized connection based on network client device 20 being associated with network 8 (e.g., classifying device 20 as a network-authorized client device) and access point 10B being associated with network 18 (e.g., classifying access point 10B as an external access point connected to a separate external network).

Responsive to identifying that connection 24 is undesired or unauthorized, authorized access point 10A may prepare (e.g., generate) and send a Probe Response management frame 62 to network client device 20. In particular, even while connected to unauthorized access point 10B, network client device 20 may periodically broadcast Probe Request management frames 60 as part of active scanning. Authorized access point 10A may send a Probe Response management frame 62 in response to a corresponding Probe Request management frame 60 received from network client device 20, or if desired, may send an unsolicited Probe Response management frame 62 (e.g., without waiting for the reception of a Probe Request management frame 60, while network client device 20 performs passive scanning, etc.).

In another illustrative scenario, an undesired connection such as connection 24' may be established between a client device 20 and a rogue access point 10C (e.g., operating in the same network 8, but not authorized by an administrator of network 8 to do so). Authorized access point 10A may similarly send a Probe Response management frame to the client device 20 in this scenario to selectively disrupt this type of undesired connection 24'.

Figure 4:
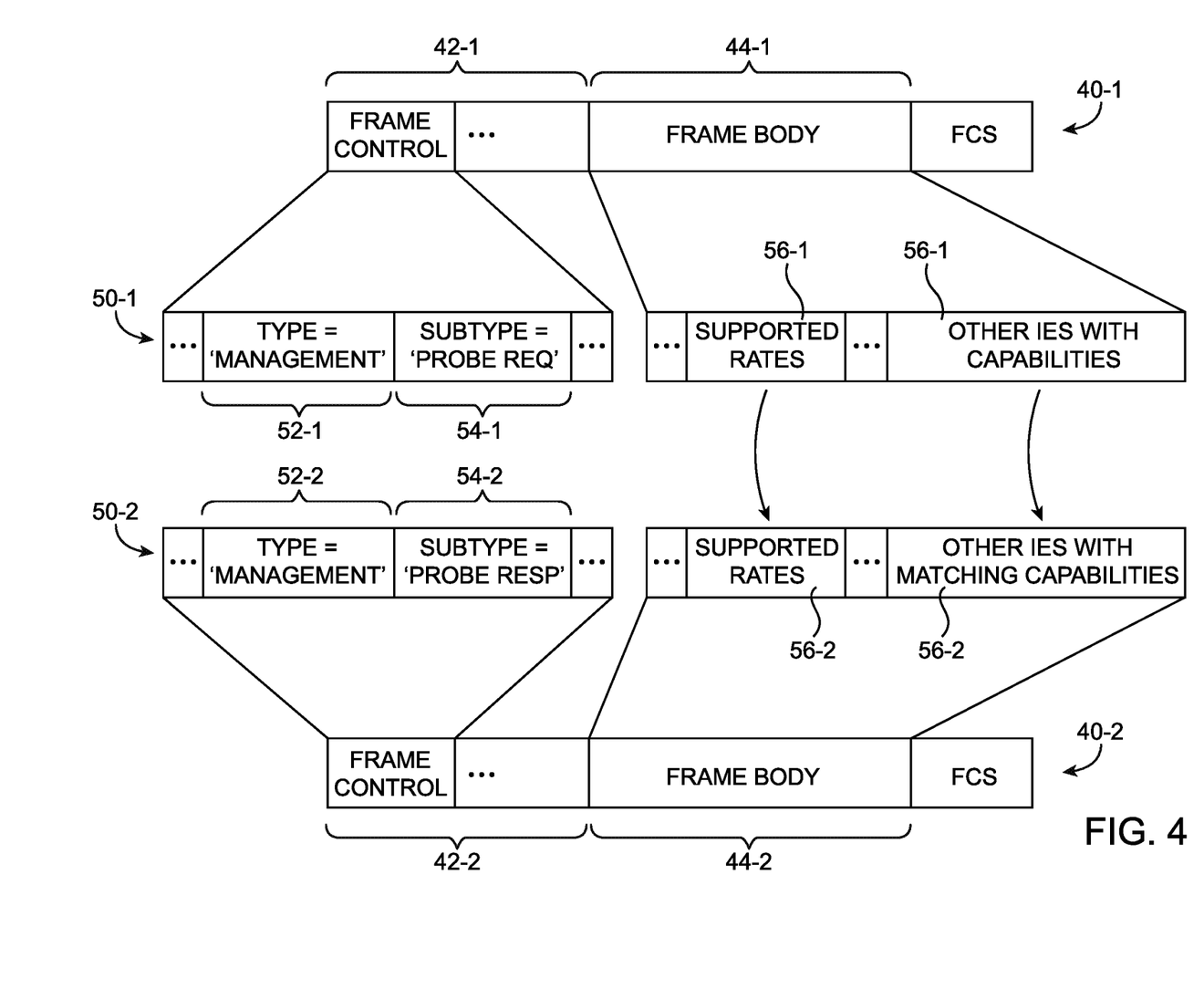
FIG. 4 is a diagram of illustrative Probe Request and Probe Response management frames in accordance with some embodiments.

FIG. 4 is a diagram of an illustrative Probe Request management frame and an illustrative Probe Response management frame. As described in connection with FIG. 3, the Probe Request frame may be broadcast from client device 20, while the Probe Response frame may be sent (e.g., unicast) from authorized access point 10A to client device 20. As shown in FIG. 4, Probe Request management frame 40-1 may have a frame type field 52-1 with a value indicative of "Management" (e.g., bits '00') and a frame subtype field 54-1 with a value indicative of "Probe Request" (e.g., bits '0100'). Frame body 44-1 of Probe Request frame 40-1 may include a number of information elements (IEs) 56-1 indicative of client device capabilities or other wireless connection parameters.

As examples, information elements 56-1 in frame body 44-1 may include supported rates and extended supported rates information, direct-sequence spread spectrum (DSSS) parameter set information, supported operating classes information, high throughput (HT) and very high throughput (VHT) capabilities information, extended capabilities information, channel usage information, interworking service capabilities information, vendor specific information, any other suitable information contained in a corresponding information element (e.g., as specified in the IEEE 802.11 standards or non-standard-compliant information).

As shown in FIG. 4, Probe Response management frame 40-2 may have a frame type field 52-2 with a value indicative of "Management" (e.g., bits '00') and a frame subtype field 54-2 with a value indicative of "Probe Response" (e.g., bits '0101'). Frame body 44-2 of Probe Response frame 40-2 may include a number of information elements (IEs) 56-2 indicative of access point capabilities or other wireless connection parameters. As examples, information elements 56-2 in frame body 44-2 may include supported rates and extended supported rates information, direct-sequence spread spectrum (DSSS) parameter set information, supported operating classes information, high throughput (HT) and very high throughput (VHT) capabilities information, extended capabilities information, channel usage information, interworking service capabilities information, vendor specific information, other information not included in information elements 56-1 in Probe Request management frame 40-1, and any other suitable information contained in a corresponding information element (e.g., as specified in the IEEE 802.11 standards or non-standard-compliant information).

In particular, in order to entice client device 20 (FIG. 3) to attempt to connect to authorized access point 10A thereby disconnecting from an unauthorized access point (e.g., external access point 10B) and severing undesired connection 24, access point 10A may send Probe Response management frame 40-2 having one or more information elements 56-2 with capabilities matching those of information elements 56-1 in Probe Request management frame 40-1. If desired, each information element 56-2 with capabilities may match or satisfy the capabilities of a corresponding information element 56-1.

As examples, access point 10A may receive a list of supported rates (and extended supported rates) of client device 20 in Probe Request frame 40-1 and may send Probe Response frame 40-2 with at least the same list of supported rates (and extended supported rates) to client device 20, access point 10A may receive high throughput (HT) capabilities of client device 20 in Probe Request frame 40-1 and may send Probe Response frame 40-2 with at least the same high throughput (HT) capabilities to client device 20, access point 10A may receive extended capabilities of client device 20 in Probe Request frame 40-1 and may send Probe Response frame 40-2 with at least the same extended capabilities to client device 20, access point 10A may receive very high throughput (VHT) capabilities of client device 20 in Probe Request frame 40-1 and may send Probe Response frame 40-2 with at least the same very high throughput (VHT) capabilities to client device 20, etc.

Furthermore, access point 10A may send Probe Response management frame 40-2 which can exhibit other desired wireless connection parameters such as a high signal strength parameter (e.g., a signal strength parameter higher than that offered by unauthorized access point or 10C as perceived by client device 20), a low noise (floor) level parameter (e.g., a noise floor parameter lower than that offered by unauthorized access point 10B or 10C as perceived by client device 20), a low operating channel utilization or load parameter (e.g., an operating channel utilization parameter lower than that of unauthorized access point 10B or 10C), and generally, any improved wireless connection parameters that are improvements over those offered by unauthorized access point 10B or 10C (as perceived by client device 20).

If desired, access point 10A may not have the capabilities and/or connection parameters as sent in Probe Request frame 40-2 and may send Probe Request frame 40-2 with enhanced (spoofed) capabilities and/or connection parameters to improve the likelihood of attracting a client device connection attempt and severing the undesired connection.

While the undesired wireless connection utilizing MFP encrypts communication of certain types of management frame using encryption keys shared by the client device and the unauthorized access point, Probe Response management frames, which are sent prior to key establishment, remain unencrypted. As such, Probe Request management frames such as frame 40-2 may still be employed to attempt to sever undesired wireless connections by offering enticing wireless connection characteristics to the client device (e.g., by offering a wireless connection to the client device that is an improvement over the undesired wireless connection). Because of their unicast nature, they can be used surgically to disrupt or sever selective (undesired) wireless connections while leaving other wireless connection undisrupted.

Figure 5:
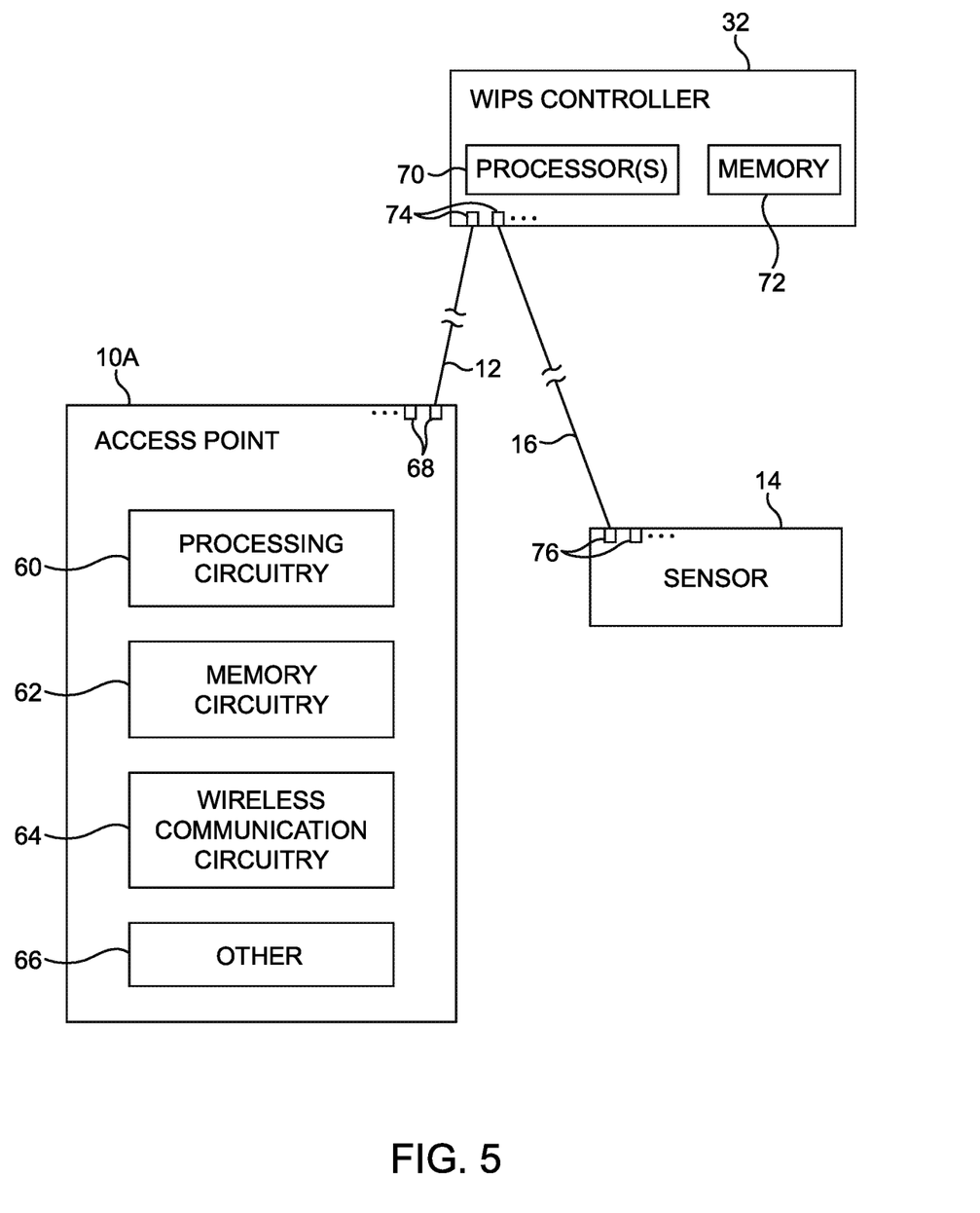
FIG. 5 is a functional block diagram of a portion of the WIPS having an illustrative access point, an illustrative sensor, and illustrative controller equipment in accordance with some embodiments.

FIG. 5 is a diagram of illustrative configurations for access point 10A and WIPS controller 32. As shown in FIG. 5, access point 10A (one or more of access points 10A in FIG. 1) may include processing circuitry 60, memory circuitry 62, wireless communications circuitry 64, and other components 66 such as input-output ports 68.

In particular, processing circuitry 60 may include one or more processors or processing units based on microprocessors on general-purpose processors, microcontrollers, digital signal processors, programmable logic devices, application specific system processors (ASSPs), application specific integrated circuit (ASIC) processors, etc. Memory circuitry 62 may include volatile memory such as dynamic random-access memory, static random-access memory, etc., and non-volatile memory such as hard-drive storage, solid-state storage, flash memory, etc.

In general, the operations described herein relating to the operation of the access point 10A and/or other relevant operations may be stored as (software) instructions on one or more non-transitory computer-readable storage media (e.g., memory circuitry 62) in each access point 10A. The corresponding processing circuitry (e.g., processing circuitry 60) in each access point for these one or more non-transitory computer-readable storage media may process the respective instructions to perform the corresponding access point operations. Processing circuitry 60 and memory circuitry 62, collectively, may sometimes be referred to herein as the control circuitry of access point 10A because the two are often collectively used to control one or more components of access point 10A to perform these operations (e.g., by sending and/or receiving requests, control signals, data, etc.).

To wirelessly communicate with host devices (e.g., client devices), access point 10A may include wireless communication circuitry 64. Wireless communication circuitry 64 may include one or more radios (e.g., Wi-Fi radios), radio-frequency transceiver circuitry, radio-frequency front-end circuitry, and one or more antennas. The one or more radios may use the one or more antennas to transmit radio-frequency signals to and receive radio-frequency signals from one or more host devices. As an example, each of access points 10A in network 8 (FIG. 1) may convey these radio-frequency signals at one or more Wi-Fi frequency bands, and more specifically at one or more radio-frequency channels in these frequency bands. While wireless communication circuitry 64 is shown as a separate element from processing circuitry 60, this is merely illustrative. If desired, portions of wireless communication circuitry 64 (e.g., radio functionalities) may be implemented on portions of processing circuitry 60.

Access point 10A may include other components 66 such as one or more input-output ports 68 such as Ethernet ports or other types of network interface ports that provided connections to other network elements (e.g., routers, modems, controllers) in the network, power ports through which power is supplied to access point 10A, or other ports. If desired, other components 66 on access point 10A may include other input-output devices such as devices that provide output to a user such as a display device (e.g., one or more status lights) and/or devices that gather input from a user such as one or more buttons. If desired, other components 66 on access point 10A may include one or more sensors (e.g., radio-frequency sensors such as sensor circuitry for processing radio-frequency signals for generating sensor data, radio-frequency sensor antennas separate from those described in connection with wireless communication circuitry 64 or shared with antennas in wireless communication circuitry 64, etc.). Each component within access point 10A may be interconnected to one or other components (e.g., to the control circuitry in access point 10A) via one or more paths (e.g., a data bus) that enable the reception and transmission of control signals and/or other data.

As shown in FIG. 5, WIPS controller 32 such as a centralized WIPS controller for controlling the operation of one or more wireless access points 10A and sensors 14 in network 8 may include processing circuitry 70, memory circuitry 72, and input-output ports 74 (e.g., separate or shared between management equipment 34 and storage equipment 36 of controller 32).

In a similar manner as described above in connection with processing circuitry 60, memory circuitry 62, and input-output ports 68 in access point 10A, the corresponding components in WIPS controller 32 may be configured in a similar manner. In particular, processing circuitry 70 may include one or more processors or processing units based on microprocessors on general-purpose processors, microcontrollers, digital signal processors, programmable logic devices, application specific system processors (ASSPs), application specific integrated circuit (ASIC) processors, etc. Memory circuitry 72 may include volatile memory such as dynamic random-access memory, static random-access memory, etc., and non-volatile memory such as hard-drive storage, solid-state storage, flash memory, etc. As an example, portions of processing circuitry 70 and memory circuitry 72 may form part of server equipment that implement management equipment 34 and/or storage equipment 36 (FIG. 1).

The operations described herein relating to the operation of WIPS controller 32 and/or other relevant operations may be stored as (software) instructions on one or more non-transitory computer-readable storage media (e.g., memory circuitry 72) in WIPS controller 32. The processing circuitry (e.g., processing circuitry 70) in WIPS controller 32 for these one or more non-transitory computer-readable storage media may process the respective instructions to perform the corresponding WIPS controller operations. Processing circuitry 70 and memory circuitry 72, collectively, may sometimes be referred to herein as the control circuitry of WIPS controller 32 because the two are often collectively used to control one or more components of WIPS controller 32 to perform these operations (e.g., by sending and/or receiving requests, control signals, data, etc.).

Input-output ports 74 of WIPS controller 32 may include Ethernet ports or other types of network interface ports that provided connections to other network elements (e.g., switches, routers, modems, controllers) in the network, power ports through which power is supplied to WIPS controller 32, or other ports. In the example of FIG. 5, port 74 of WIPS controller 32 is coupled to port 68 of access point 10A, thereby forming an interconnecting path 12. Path 12 may enable WIPS controller 32 and access point 10A to convey control signals (or commands) or other configuration information between them, thereby serving as a communication path. Path 12 may be a direct path (e.g., WIPS controller 32 is connected to access point 10 via no other intervening network nodes or elements) or an indirect path (e.g., WIPS controller 32 is connected to access point 10A via one or more intervening network nodes or elements). Each access point 10A in network 8 (FIG. 1) may be coupled to and therefore communicate with centralized controller 32 using any of the above-mentioned means. If desired, each access point 10A in network 8 may be coupled to multiple portions of WIPS controllers 32 (e.g., separately coupled to management equipment 34 and to database equipment 36).

In some illustrative arrangements in which dedicated sensors 14 are included in the WIPS of network 8, some of ports 74 of WIPS controller 32 (e.g., of management equipment 34 and/or of storage equipment 36) may be coupled to a sensor 14 (e.g., to a corresponding port 76 of sensor 14). Path 16 connecting WIPS controller 32 to sensor 14 may enable WIPS controller 32 and sensor 14 to convey control signals (or commands) or other configuration information or data between them (e.g., the conveyance of sensor data from sensor 14 to WIPS controller 32), thereby serving as a communication path. Similar to path 12, path 16 may be a direct path or an indirect path.

Sensor 14 may have some of the same components as access point 10A in order to perform its sensing functions (e.g., processing circuitry, memory circuitry, wireless communication circuitry, etc.). As such, in some illustrative arrangements, access point 10A may use its components to perform radio-frequency sensing functions in addition to its wireless connectivity functions, and a dedicated sensor 14 may be omitted.

In some illustrative arrangements, a separate centralized controller 32 may be omitted from the WIPS in network 8. In particular, in these arrangements, access point 10A may individually perform detection and prevention operations that would otherwise be performed by a centralized WIPS controller. As examples, access point 10A may gather sensor data (internally or using separate dedicated sensors 14), may store and/or analyze the gathered sensor data to detect undesired connections, may perform prevention operations (e.g., attempt to selectively sever or otherwise disrupt undesired connections by sending Probe Response management frames).

Figure 6:
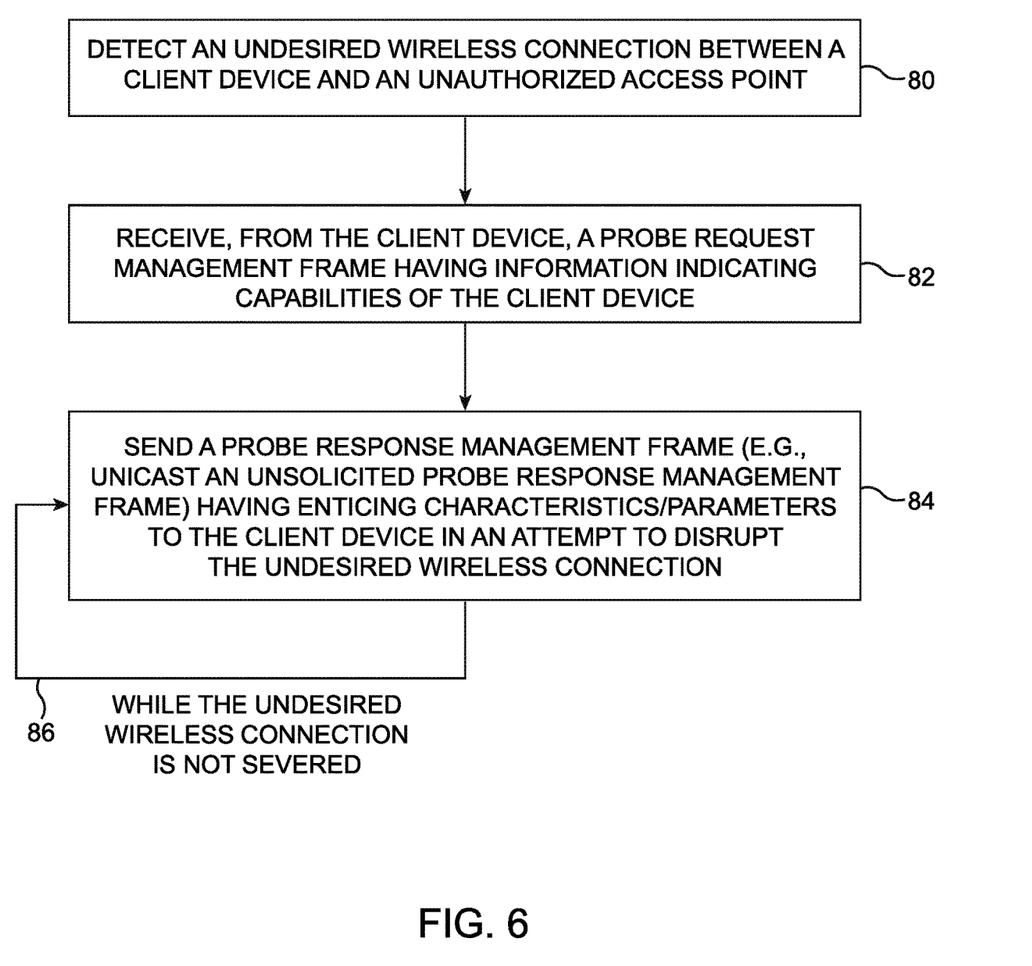
FIG. 6 is a flowchart of illustrative operations involved in disrupting a wireless connection between a client device and an unauthorized access point in accordance with some embodiments.

FIG. 6 is a flowchart of illustrative operations for disrupting an undesired wireless connection between a client device and a wireless access point. The operations described in connection with FIG. 6 may be performed by one or more components in the WIPS such as one or more access points 10A, one or more sensors 14, and/or WIPS controller 32 in network 8. While some operations are described as being performed at a sensor 14 and/or a WIPS controller 32, if desired, these operations may be performed internally at an access point 10A (e.g., in a WIPS configuration where sensors 14 and/or a centralized WIPS controller 32 are omitted).

At operation 80, the control circuitry (e.g., processing circuitry 70 when processing instructions on memory circuitry 72) for WIPS controller 32 may command one or more sensors 14 (and/or access points 10A serving sensor functions) to gather sensor data indicative of different Wi-Fi transmitters and/or receivers in the radio-frequency environment (e.g., intercepting radio-frequency signals from one or more access points, one or more (client) host devices, and other Wi-Fi transmitters and/or receivers in their vicinities). If desired, the gathered sensor data may be stored at a database portion of WIPS controller 32, and may be processed at a management portion of WIPS controller 32.

In particular, the control circuitry for WIPS controller 32 (e.g., processing circuitry associated with the management portion of WIPS controller 32) may access the (stored) sensor data and process the sensor data to determine a type of each device in the radio-frequency environment (e.g., classifying a client device as belonging to network 8 or belonging to an external network, classifying a wireless access point as belonging to network 8 and being authorized (by an administrator of) network 8, belonging to network 8 but being unauthorized (by an administrator of) network 8, or belonging to an external network 18 separate from network 8, etc.). By determining the type of devices present, the control circuitry for WIPS controller 32 may determine whether one or more wireless connections between one or more pairs of client and access point are undesired or unauthorized wireless connections.

In particular, the one or more detected unauthorized wireless connections may utilize Management Frame Protection (MFP), which causes communication of certain types of management frames to be encrypted between the client and access point communicating via the unauthorized wireless connection. Most relevantly, Deauthentication management frames may be encrypted between the client and access point, thereby making the undesired wireless connection resilient to disruption using spoofed Deauthentication management frames.

Using FIG. 3 as an illustrative example when describing operation 80, WIPS controller 32, when performing operation 80, may identify one or more authorized access points 10A in network 8, one or more rogue access points 10C in network 8, one or more external access points 10B in network 18 or other networks, one or more network-authorized client devices 20 (e.g., in network 8), or one or more non-network-authorized client devices (e.g., not in or external to network 8), etc. Based the classification of access points 10A, 10B, 10C, and client device 20, WIPS controller 32, when performing operation 80, may detect unauthorized connection 24 between network client device 20 and external access point 10B (or unauthorized connection 24' between client device 20 and rogue access point 10C). In illustrative configurations described herein as an example, connection 24 (or connection 24') may utilize MFP.

As mentioned above, while the control circuitry for WIPS controller 32 is described to perform operation 80, if desired, the control circuitry (e.g., processing circuitry 60 when processing instructions on memory circuitry 62) for an access point 10A may instead perform operation 80 internally. If desired, an access point 10A may also serve WIPS sensor functions internally, and gather and store the sensor data (as well as process the sensor data internally to detect undesired wireless connection as described in connection with operation 80). Alternatively, if desired, control circuitry (e.g., processing circuitry when processing instructions on memory circuitry) for a WIPS sensor 14 may instead perform operation 80 internally.

At operation 82, an access point 10A (e.g., processing circuitry 60 on access point 10A) may receive, using wireless communication circuitry 64, a Probe Request management frame from a client device with an unauthorized wireless connection (e.g., client device 20 with unauthorized external network connection 24 in FIG. 3).

If desired, any additional neighboring access points 10A may also receive the broadcast of the Probe Request management frame. If desired, in a configuration with centralized controller 32, one or more neighboring access points 10A may convey information indicative of reception of the Probe Request management frame to controller 32. If desired, the control circuitry for a WIPS sensor 14 may instead or also perform operation 82.

At operation 84, the control circuitry for WIPS controller 32 may command (e.g., send one or more control and/or configuration signals to) a selected access point 10A to send a Probe Response management frame having enticing characteristics and/or parameters to the client device with the unauthorized wireless connection in an attempt to selectively disrupt (e.g., selectively sever) the undesired wireless connection (without disrupting other wireless connections). Because the aim of the sending of the Probe Response management frame is to selectively disrupt the undesired wireless connection, the sending of the Probe Response management frame may be responsive to the detection of the undesired wireless connection. When performed as part of the active scanning process of the client device (e.g., as part of WLAN roaming), the sending of the Probe Response management frame may also be responsive to the receiving of the Probe Request management frame.

In an illustrative configuration where WIPS controller 32 is coupled to and commands a set of multiple access points 10A, WIPS controller 32 may send a control signal to the most optimal access point 10A out of the set based on a comparison of capabilities and/or wireless connection parameters between the multiple access points 10A with respect to the client device with the unauthorized wireless connection. This helps improve the likelihood that the client device may attempt to form a new wireless connection with an authorized access point 10A, thereby severing the unauthorized wireless connection.

As described in connection with FIG. 4, the enticing characteristics and/or parameters may be reflected in information elements 56-2 in Probe Response frame 40-2 indicating capabilities that at least match (if not exceed) the capabilities advertised by the client device in information elements 56-1 in Probe Request frame 40-1, and may generally include wireless connection parameters that are improvements over those offered by the unauthorized access point (with which the client device established the unauthorized wireless connection).

In particular, an access point 10A may be configured to generate a Probe Response frame with the enticing characteristics and/or parameters (e.g., matching supported rates, matching capabilities, improved signal, noise, or load parameters, etc.). Reception of the control signal from WIPS controller 32 may cause the access point 10A to generate and send (unicast) the Probe Response frame to the client device.

As mentioned above, while the control circuitry for WIPS controller 32 is described to perform at least a part of operation 84, if desired, the control circuitry for an access point 10A may instead perform (all portions of) operation 84 internally. In particular, if desired, responsive to detecting the undesired wireless connection and/or receiving the probe request management frame, access point 10A may internally generate the control signal to cause the Probe Response frame to be sent to the client device. If desired, the control circuitry for a WIPS sensor 14 may instead or also perform operation 84.

If desired, one or more (e.g., all) of operations 80, 82, and 84 may occur or be performed continuously (e.g., with a desired periodicity). In particular, if desired, while the undesired connection remains un-severed (e.g., a determination based on repeated detection of the same undesired wireless connection, based on repeatedly receiving the Probe Request management frame from the same client device, etc.), operation 84 may be performed continuously (e.g., periodically in response to each instance of detection of the same undesired wireless connection and/or reception of each Probe Request management frame from the same client device). In other words, as shown by path 86 in FIG. 6, operation 84 may be continuously performed as described above (e.g., one or more access points 10A may repeatedly unicast unsolicited probe response management frames to the same client device), while the undesired wireless connection remains intact or is not severed (e.g., in response to operation 80 resulting in the same undesired wireless connection being detected). If desired, some portions of operations 80, 82, and/or 84 may occur or be performed simultaneously with portion of the other two operations or may generally occur or be performed at any suitable time relative to one another.

In general, the operations described herein relating to the detecting of an undesired wireless connection, receiving of a Probe Request frame, sending of a Probe Response frame, the included sub-operations, and any other associated operations may be stored as software instructions on one or more non-transitory computer-readable storage media associated with one or more access points 10A (e.g., memory circuitry 62 in access point 10A), one or more sensors 14 (e.g., memory circuitry on sensor 14), one or more portions of WIPS controller 32 (e.g., memory circuitry 72 implementing management equipment 34 and/or database equipment 36), and/or other network devices in the network (e.g., in the WIPS of network 8). The corresponding processing circuitry (e.g., processing circuitry 60 in access point 10A, processing circuitry in sensor 14, processing circuitry 70 in WIPS controller 32, etc.) associated with these one or more non-transitory computer-readable storage media may process the respective instructions to perform the corresponding operations.

While the undesired wireless connection utilizing MFP encrypts communication of certain types of management frame using encryption keys shared by the client device and the unauthorized access point, Probe Response management frames, which are sent prior to key establishment, remain unencrypted. As such, Probe Request management frames may still be employed to attempt to sever undesired wireless connections. Because of their unicast nature, they can be used surgically to disrupt or sever selective (undesired) wireless connections while leaving other wireless connection undisrupted.

The foregoing is merely illustrative of the principles of this invention and various modifications can be made by those skilled in the art without departing from the scope and spirit of the invention.

What is claimed is:

1. A method of disrupting an unauthorized wireless connection to a network, the method comprising:
   detecting the wireless connection, wherein the wireless connection is between a client device in the network and an unauthorized wireless access point and wherein the client device is an authorized client device;
   detecting a wireless local area network (WLAN) media access control (MAC) Probe Request management frame from the client device, wherein the WLAN MAC Probe Request management frame includes a header portion, a payload portion, and a frame check sequence and wherein the header portion includes a frame type field having bits indicative of a management frame and a frame subtype field having bits indicative of a type of management frame; and responsive to detecting the wireless connection, sending a WLAN MAC Probe Response management frame to the client device.

2. The method defined in claim 1, wherein the WLAN MAC Probe Request management frame includes a set of information elements indicating capabilities of the client device, and the WLAN MAC Probe Response management frame includes a corresponding set of information elements indicating capabilities at least matching the indicated capabilities of the client device.

3. The method defined in claim 2, wherein the capabilities of the client device comprise a list of supported rates, and the matching capabilities indicated in the WLAN MAC Probe Response management frame comprise at least each supported rate in the list of support rates.

4. The method defined in claim 1, wherein the WLAN MAC Probe Response management frame includes information indicative of a wireless connection parameter that is an improvement over a corresponding connection parameter offered by the unauthorized wireless access point as perceived by the client device.

5. The method defined in claim 4, wherein the wireless connection parameter comprises at least one of a signal strength parameter, a noise level parameter, or a channel utilization parameter.

6. The method defined in claim 1, wherein the detected wireless connection uses Management Frame Protection (MFP).

7. The method defined in claim 1, wherein the unauthorized wireless access point is an access point connected to an additional network different from the network.

8. The method defined in claim 1, wherein the unauthorized wireless access point is connected to the network.

9. One or more non-transitory computer-readable storage media comprising computer-executable instructions that, when executed by one or more processors for a wireless intrusion prevention system, cause the one or more processors to:
identify a control signal indicative of an external network connection between a client device and an unauthorized wireless access point, the external network connection utilizing Management Frame Protection (MFP) that encrypts communication of some types of wireless local area network (WLAN) media access control (MAC) management frames; and
send a WLAN MAC management frame to the client device, in response to the identified control signal indicative of the external network connection utilizing MFP, to disrupt the external network connection, wherein the sent WLAN MAC management frame includes a header portion, a payload portion, and a frame check sequence and wherein the header portion includes a frame type field having bits indicative of a management frame and a frame subtype field having bits indicative of a type of management frame.

10. The one or more non-transitory computer-readable storage media defined in claim 9, wherein sending the WLAN MAC management frame to the client device comprises sending a WLAN MAC Probe Response management frame to the client device, in response to the identified control signal indicative of the external network connection utilizing MFP, to disrupt the external network connection.

11. The one or more non-transitory computer-readable storage media defined in claim 10, wherein sending the WLAN MAC Probe Response management frame to the client device is responsive to a WLAN MAC Probe Request management frame from the client device.

12. The one or more non-transitory computer-readable storage media defined in claim 9, wherein the identified control signal is received from a centralized controller.

13. The one or more non-transitory computer-readable storage media defined in claim 9, wherein the identified control signal is generated internally within an authorized wireless access point.

14. The one or more non-transitory computer-readable storage media defined in claim 9, wherein the unauthorized wireless access point is a rogue access point or an external access point.

15. A method of operating a wireless access point to disrupt an unauthorized wireless connection to a network that includes the wireless access point, the method comprising:
generating a control signal indicative of an external network connection between a client device and an external wireless access point in an external network, the external network connection utilizing Management Frame Protection (MFP); and
causing the wireless access point to send a wireless local area network (WLAN) media access control (MAC) Probe Response management frame to the client device based at least in part on the generated control signal indicative of the external network connection utilizing MFP, wherein the WLAN MAC Probe Response management frame includes a header portion, a payload portion, and a frame check sequence and wherein the header portion includes a frame type field having bits indicative of a management frame and a frame subtype field having bits indicative of a type of management frame.

16. The method defined in claim 15 further comprising:
selecting the wireless access point out of a set of wireless access points in the network to send the WLAN MAC Probe Response management frame to the client device based at least in part on capabilities of the selected wireless access point.

17. The method defined in claim 16 further comprising:
sending the generated control signal indicative of the external network connection utilizing MFP to the selected wireless access point over a wired network path.

18. The method defined in claim 15 further comprising:
determining a type of the client device and a type of the external wireless access point based at least in part on obtained sensor data, wherein generating the control signal indicative of the external network connection is based at least in part on the determined type of the client device and the determined type of the external wireless access point.

19. The method defined in claim 18, wherein the obtained sensor data is gathered at the wireless access point.

20. The method defined in claim 19, wherein generating the control signal indicative of the external network connection comprises generating the control signal indicative of the external network connection at the wireless access point.

* * * * *